United States Patent
Lee et al.

(10) Patent No.: US 9,417,484 B2
(45) Date of Patent: Aug. 16, 2016

(54) LIQUID CRYSTAL DISPLAY AND MANUFACTURING METHOD THEREOF

(75) Inventors: Jun-Woo Lee, Anyang-si (KR); Jong-Sung Bae, Hwaseong-si (KR); Hoi-Lim Kim, Eujeongbu-si (KR); Baek-Kyun Jeon, Yongin-si (KR); Suk-Hoon Kang, Seoul (KR); Jin-Soo Jung, Goyang-si (KR); Soo-Ryun Cho, Gunpo-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1016 days.

(21) Appl. No.: 12/483,630

(22) Filed: Jun. 12, 2009

(65) Prior Publication Data

US 2010/0128214 A1    May 27, 2010

(30) Foreign Application Priority Data

Nov. 27, 2008    (KR) .................. 10-2008-0118940

(51) Int. Cl.
*G02F 1/1337* (2006.01)
*G02F 1/1333* (2006.01)

(52) U.S. Cl.
CPC ..... *G02F 1/133788* (2013.01); *B32B 2457/202* (2013.01); *G02F 2001/133397* (2013.01); *Y10T 428/1005* (2015.01)

(58) Field of Classification Search
None
See application file for complete search history.

(56) References Cited

U.S. PATENT DOCUMENTS

| | | |
|---|---|---|
| 5,693,379 A | 12/1997 | Sugimori et al. |
| 6,201,588 B1 * | 3/2001 | Walton et al. ............ 349/123 |
| 6,218,501 B1 * | 4/2001 | Choi et al. ............ 528/170 |
| 6,238,752 B1 | 5/2001 | Kato et al. |
| 6,572,939 B2 * | 6/2003 | Kwon ............ G02F 1/133711 252/299.4 |
| 6,613,245 B1 * | 9/2003 | Ohlemacher et al. .... 252/299.62 |
| 7,037,443 B2 | 5/2006 | Shuto et al. |
| 7,396,572 B2 | 7/2008 | Kim et al. |
| 7,782,430 B2 | 8/2010 | Chida et al. |
| 8,057,868 B2 | 11/2011 | Terashita et al. |
| 8,395,734 B2 | 3/2013 | Park |
| 8,654,289 B2 | 2/2014 | Park |
| 2005/0260334 A1 * | 11/2005 | Kwok et al. ............ 427/58 |
| 2006/0035086 A1 * | 2/2006 | Amos et al. ............ 428/411.1 |
| 2006/0186913 A1 * | 8/2006 | Kim ............ 324/770 |
| 2006/0194000 A1 | 8/2006 | Schadt et al. |
| 2006/0280880 A1 | 12/2006 | Park |
| 2010/0085523 A1 | 4/2010 | Terashita et al. |
| 2010/0188628 A1 | 7/2010 | Kwak et al. |
| 2010/0305230 A1 | 12/2010 | Li et al. |
| 2011/0007254 A1 | 1/2011 | Terashita et al. |

FOREIGN PATENT DOCUMENTS

| | | |
|---|---|---|
| CN | 1825176 A | 8/2006 |
| JP | 08120078 A | 5/1996 |

(Continued)

*Primary Examiner* — Gwendolyn Blackwell
*Assistant Examiner* — Anthony J Frost
(74) *Attorney, Agent, or Firm* — Cantor Colburn LLP

(57) ABSTRACT

A liquid crystal display includes; a first substrate, a second substrate disposed facing the first substrate, an alignment layer disposed on at least one of the first substrate and the second substrate, wherein the alignment layer comprises a major alignment material and a vertical photo-alignment material, and the vertical photo-alignment material comprises a first vertical functional group, and a liquid crystal layer interposed between the first substrate and the second substrate.

17 Claims, 11 Drawing Sheets

(56) References Cited

FOREIGN PATENT DOCUMENTS

| | | |
|---|---|---|
| JP | 10268318 A | 10/1998 |
| JP | 2002174725 A | 6/2002 |
| JP | 2003043492 A | 2/2003 |
| JP | 2003073471 A | 3/2003 |
| JP | 2003161946 A | 6/2003 |
| JP | 2005053766 A | 3/2005 |
| JP | 2006512422 A | 4/2006 |
| JP | 2007304509 A | 11/2007 |
| JP | 2008076950 A | 4/2008 |
| JP | 4168593 B2 | 8/2008 |
| JP | 5059183 B2 | 8/2012 |
| KR | 1019980079983 A | 11/1998 |
| KR | 1020060130387 A | 12/2006 |
| WO | 2008117615 A1 | 10/2008 |
| WO | 2009107406 A1 | 9/2009 |

* cited by examiner

LIQUID CRYSTAL DISPLAY AND MANUFACTURING METHOD THEREOF

This application claims priority to Korean Patent Application No. 10-2008-0118940, on Nov. 27, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display ("LCD"), and a method of manufacturing the same.

(b) Description of the Related Art

Liquid crystal displays ("LCDs") are now widely used as one type of flat panel display. An LCD includes two display panels on which field generating electrodes such as pixel electrodes and a common electrode are typically formed, and a liquid crystal layer interposed between the panels. In the typical LCD, voltages are applied to the field generating electrodes so as to generate an electric field over the liquid crystal layer, and the alignment of liquid crystal molecules of the liquid crystal layer is determined by the electric field. Accordingly, the polarization of incident light is controlled, thereby varying light transmission through the LCD and allowing for image display.

Meanwhile, an alignment layer is typically formed on the inner surfaces of the two display panels to align liquid crystal molecules of the liquid crystal layer. If no voltage is applied to the field generating electrodes, the liquid crystal molecules of the liquid crystal layer are aligned in a predetermined direction by way of the alignment layer. With the application of a voltage to the field generating electrodes, the liquid crystal molecules of the liquid crystal layer are rotated in the direction of the electric field.

BRIEF SUMMARY OF THE INVENTION

An exemplary embodiment of a liquid crystal display ("LCD") includes; a first substrate, a second substrate facing the first substrate, an alignment layer disposed on at least one of the first substrate and the second substrate, wherein the alignment layer includes a major alignment material and a vertical photo-alignment material containing a first vertical functional group, and a liquid crystal layer interposed between the first and second substrate.

In one exemplary embodiment, a molar concentration ratio of the vertical photo-alignment material to the major alignment material may increase with a height of the alignment layer up to a surface thereof.

In one exemplary embodiment, the first vertical functional group may disposed within the alignment layer from the surface of the alignment layer to a depth of the alignment layer corresponding to about 20% of a thickness thereof.

In one exemplary embodiment, a weight ratio of the vertical photo-alignment material to the major alignment material may be from about 5:95 to about 50:50.

In one exemplary embodiment, a weight ratio of the vertical photo-alignment material to the major alignment material is from about 10:90 to about 40:60.

In one exemplary embodiment, the major alignment material may contain a second vertical functional group at a concentration of about 5 mol % or less.

In one exemplary embodiment, a pre-tilt angle of the liquid crystal may be about 80 degrees to about 90 degrees.

In one exemplary embodiment, the vertical photo-alignment material may contain an imide group at a concentration of about 75 mol % or more.

In one exemplary embodiment, the major alignment material may contain the imide group at a concentration of about 50 mol % to about 80 mol %.

In one exemplary embodiment, the vertical photo-alignment material may contain a diamine-based compound having a first side chain and second side chain.

In one exemplary embodiment, the first vertical functional group may contain at least one compound selected from the group consisting of an aryl group substituted with at least one of a $C_3$-$C_{10}$ alkyl group and a $C_{3-10}$ alkoxy group, and a cyclohexyl group substituted with at least one of a $C_3$-$C_{10}$ alkyl group and a $C_3$-$C_{10}$ alkoxy group.

In one exemplary embodiment, the LCD may further include; a first signal line disposed on the first substrate, a second signal line disposed substantially perpendicular to the first signal line, a thin film transistor ("TFT") connected to the first signal line and the second signal line, a pixel electrode connected to the TFT, and a common electrode disposed on the second substrate.

In one exemplary embodiment, the pixel electrode may include a first sub-pixel electrode and a second sub-pixel electrode separated from each other.

In one exemplary embodiment, the second sub-pixel electrode may include; a first electrode portion disposed above the first sub-pixel electrode in a vertical direction, a second electrode portion disposed below the first sub-pixel electrode in the vertical direction, and a plurality of connector portions disposed to both a left and a right of the first sub-pixel electrode and interconnecting the first and second electrode portions.

In one exemplary embodiment, the liquid crystal has negative dielectric anisotropy, and may be aligned substantially vertically with respect to the first substrate and the second substrate.

Another exemplary embodiment of the present invention provides a method of manufacturing an LCD, the method include; applying a mixture of a major alignment material and a vertical photo-alignment material containing a first vertical functional group to at least one of first substrate and the second substrate, forming an alignment layer by illuminating ultraviolet rays onto the mixture, disposing a liquid crystal material onto the alignment layer, and combining the first substrate and the second substrate with each other.

In one exemplary embodiment, the ultraviolet rays may be illuminated in at least two directions to form multiple domains wherein liquid crystal materials differ in pre-tilt direction from each other.

Another exemplary embodiment of the present invention provides an alignment material of liquid crystal display, the alignment material include; a major alignment material and a vertical photo-alignment material containing a first vertical functional group.

In one exemplary embodiment, a weight ratio of the vertical photo-alignment material to the major alignment material is about 5:95 to about 50:50.

In one exemplary embodiment, a weight ratio of the vertical photo-alignment material to the major alignment material is from about 10:90 to about 40:60.

In one exemplary embodiment, the vertical photo-alignment material comprises an imide group at a concentration of about 75 mol % or more.

In one exemplary embodiment, the vertical photo-alignment material comprises a diamine-based compound having a first side chain and a second side chain.

In one exemplary embodiment, the first vertical functional group contains at least one compound selected from the group consisting of an aryl group substituted with at least one of a C3-C10 alkyl group and a C3-C10 alkoxy group, and a cydohexyl group substituted with at least one of a C3-C10 alkyl group and a C3-C10 alkoxy group.

In one exemplary embodiment, the major alignment material comprises the imide group at a concentration of about 50 mol % to about 80 mol %.

In one exemplary embodiment, the major alignment material comprises a second vertical functional group at a concentration of about 5 mol % or less With an LCD according to an exemplary embodiment of the present invention, an aliment layer thereof contains a vertical photo-alignment material and a major alignment material, and is formed only through illuminating ultraviolet rays without conducting a rubbing process in a separate manner, thereby reducing afterimage and spot occurrences.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION OF THE INVENTION

Figure 1:
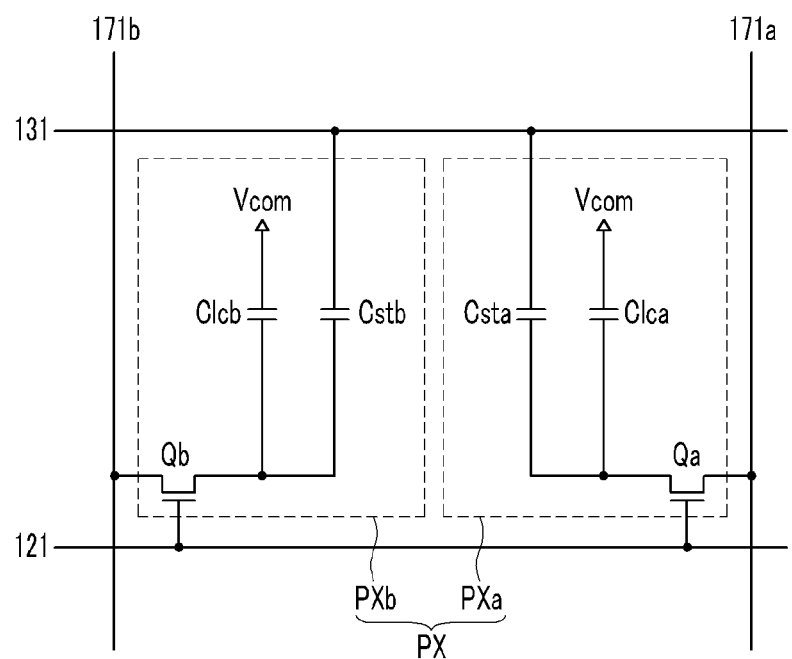
FIG. 1 is an equivalent circuit diagram of an exemplary embodiment of a pixel in a liquid crystal display ("LCD") according to the present invention.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may also be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
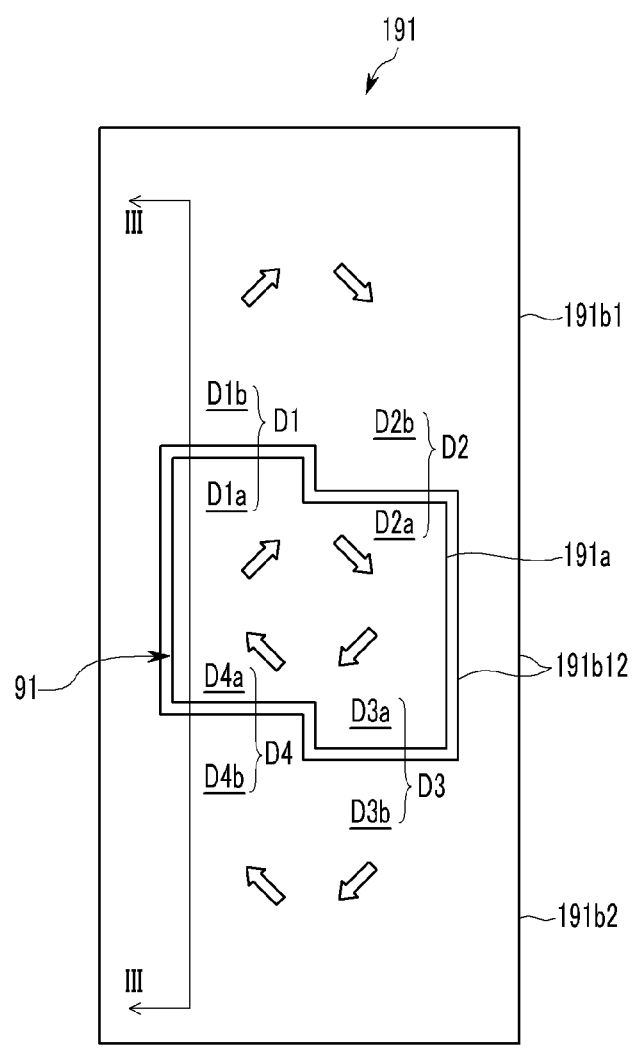
FIG. 2 is a top plan layout view of an exemplary embodiment of a pixel electrode in an LCD according to the present invention.
Figure 3:
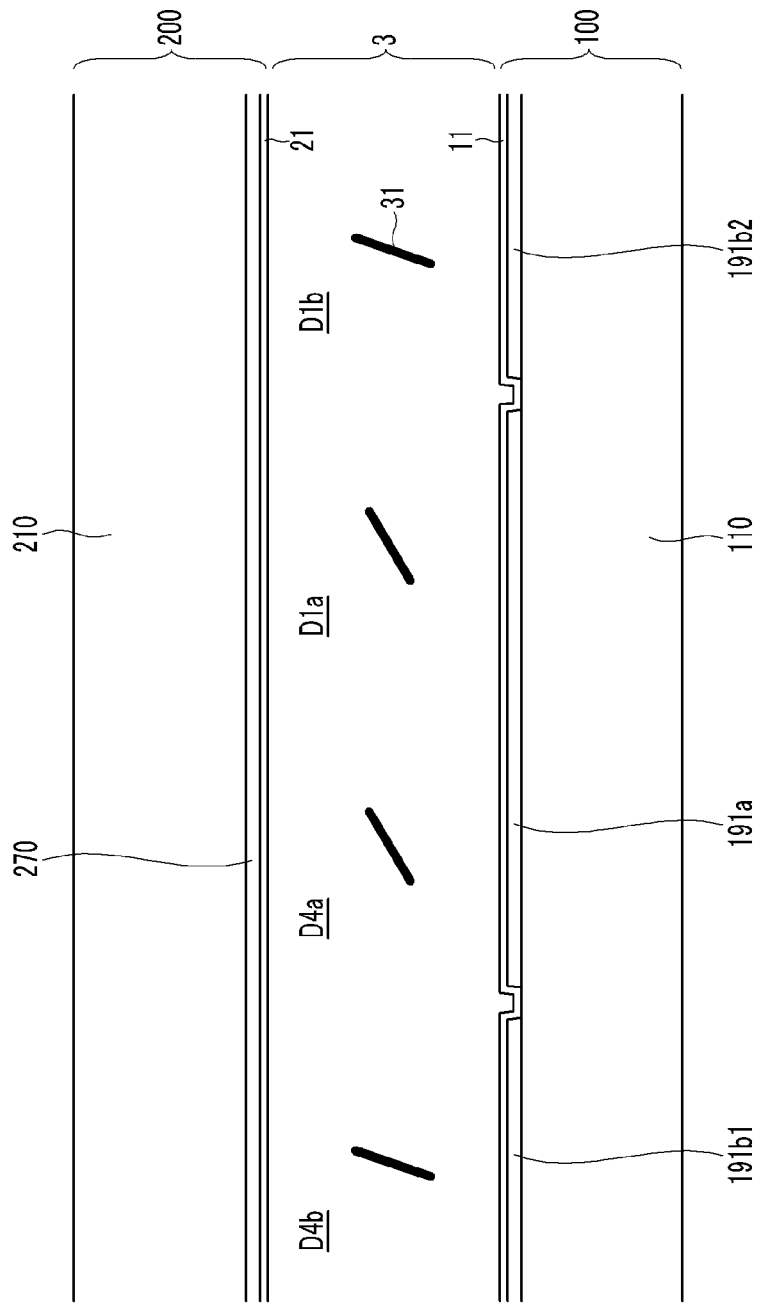
FIG. 3 is a schematic cross-sectional view of an exemplary embodiment of an LCD with the pixel electrode shown in FIG. 2 taken along line III-III.

FIG. 1 is an equivalent circuit diagram of an exemplary embodiment of a pixel in a liquid crystal display ("LCD") according to the present invention, and FIG. 2 is a top plan layout view of an exemplary embodiment of a pixel electrode in an LCD according to the present invention. FIG. 3 is a schematic cross-sectional view of an exemplary embodiment of an LCD with the pixel electrode shown in FIG. 2 taken along line III-III.

Referring to FIG. 1, an exemplary embodiment of an LCD according to the present invention includes a plurality of signal lines 121, 131, 171a, and 171b, and pixels PX connected thereto.

Referring to FIG. 2 and FIG. 3, the exemplary embodiment of an LCD includes lower and upper display panels 100 and 200 facing each other, and a liquid crystal layer 3 interposed between the two panels 100 and 200. Pixel electrodes 191 are formed on the lower display panel 100, and a common electrode 270 is formed on the upper display panel 200.

Alignment layers 11 and 21 are formed on the pixel and common electrodes 191 and 270, respectively. A detailed description of the alignment layers 11 and 21 will be given later.

In the present exemplary embodiment, the pixel electrode 191 includes first and second sub-pixel electrodes 191a and 191b, which are separated from each other.

The signal lines 121, 131, 171a and 171b are formed on the lower panel 100, and include gate lines 121 for transmitting gate signals, a pair of data lines 171a and 171b for transmitting data voltages, and storage electrode lines 131 for storing storage voltages. Exemplary embodiments include configurations including only a single data line per pixel. Exemplary embodiments also include configurations wherein the storage electrode line is omitted.

In the present exemplary embodiment, the pixels PX each include a pair of sub-pixels PXa and PXb, each of which includes switching elements Qa and Qb, liquid crystal capacitors Clca and Clcb, and storage capacitors Csta and Cstb.

In the present exemplary embodiment, the switching elements Qa and Qb are three terminal elements with gate, source, and drain electrodes formed on the lower panel 100. The gate electrode of the switching elements Qa and Qb is connected to the gate line 121 and the source electrode thereof is connected to the data lines 171a and 171b, while the drain electrode thereof is connected to the liquid crystal capacitors Clca and Clcb and the storage capacitors Csta and Cstb. In one exemplary embodiment, the switching elements Qa and Qb may be thin film transistors ("TFTs").

The liquid crystal capacitors Clca and Clcb include the sub-pixel electrodes 191a and 191b of the lower display panel 100 and the common electrode 270 of the upper display panel 200 as two terminals thereof, and the liquid crystal layer interposed between the two terminals 191a and 191b and 270 as a dielectric. The sub-pixel electrodes 191a and 191b are connected to the switching elements Qa and Qb, and in the present exemplary embodiment the common electrode 270 is formed on substantially the entire surface of the upper display panel 200 and receives a common voltage Vcom.

The storage capacitors Csta and Cstb serve to assist the liquid crystal capacitors Clca and Clcb and are formed through overlapping the storage electrode line 131 with the pixel electrodes 191a and 191b and by interposing an insulator between the storage electrode line 131 and the pixel electrodes 191a and 191b. Exemplary embodiments include configurations wherein the storage capacitors Csta and Cstb may be omitted.

Referring to FIG. 2, in the present exemplary embodiment, the pixel electrode 191 is formed in the shape of a rectangle elongated in the vertical direction, and the first sub-pixel electrode 191a thereof is surrounded by the second sub-pixel electrode 191b.

In the present exemplary embodiment, the first sub-pixel electrode 191a has a shape wherein two substantially identical rectangles elongated in the vertical direction are attached to each other in an off-set configuration in the horizontal direction. In the present exemplary embodiment, the vertical direction refers to a length direction of the pixel electrode 191, e.g., a direction substantially parallel to the data lines 171 and a horizontal direction refers to a width direction, e.g., a direction substantially parallel to the gate lines 121. In an exemplary embodiment wherein the two substantially identical rectangles are attached to each other in a non-offset configuration, they form a square. However, alternative exemplary embodiments include configurations wherein the length ratio of horizontal side to vertical side of the first sub-pixel electrode 191a may be altered in other ways.

The second sub-pixel electrode 191b surrounds the first sub-pixel electrode 191a with a gap 91 having a roughly uniform width, and includes an upper electrode portion 191b1 formed above the first sub-pixel electrode 191a, a lower electrode portion 191b2 formed below the first sub-pixel electrode 191a, and bridge portions 191b12 interconnecting the upper and lower electrode portions 191b1 and 191b2 on the left and right sides of the first sub-pixel electrode 191a.

In the present exemplary embodiment, the second sub-pixel electrode 191b is greater in size than the first sub-pixel electrode 191a, and it is possible to control the length ratio of the vertical side of the first sub-pixel electrode 191a to the vertical side of the second sub-pixel electrode 191b and obtain a desired area ratio thereof. In one exemplary embodiment, the second sub-pixel electrode 191b may be roughly two times the area of the first sub-pixel electrode 191a. In such an exemplary embodiment, the first sub-pixel electrode 191a, the upper electrode portion 191b1, and the lower electrode portion 191b2 may all have substantially the same area.

In the present exemplary embodiment, the liquid crystal layer 3 has negative dielectric anisotropy, and liquid crystal molecules thereof are vertically aligned. Polarizers (not shown) may be attached to the outer surfaces of substrates 110 and 210, respectively. The polarization axes of the polarizers may be substantially perpendicular to each other while being inclined with respect to the horizontal and vertical directions, e.g., the width and length directions, respectively, of the pixel electrodes 191, by about 45 degrees.

When an electric field is not generated at the liquid crystal layer 3, that is, when there is no voltage difference between the pixel and common electrodes 191 and 270, liquid crystal molecules 31 may be oriented substantially perpendicular to the surface of the alignment layers 11 and 21, or may be slightly inclined with respect thereto.

When a potential difference is generated between the pixel and common electrodes 191 and 270, an electric field substantially perpendicular to the surface of the display panels 100 and 200 is generated at the liquid crystal layer 3. Hereinafter, the pixel electrode 191 and the common electrode 270 will be collectively referred to as the "field generating electrodes." The liquid crystal molecules 31 of the liquid crystal layer 3 are inclined in response to the electric field to be substantially perpendicular to the direction of the electric field. The polarization degree of the light incident upon the liquid crystal layer 3 is varied depending upon the inclination degree of the liquid crystal molecules 31. The variation in polarization is expressed by a variation in light transmittance by way of the polarizers so that the LCD can display images with varying grayscales.

The inclination direction of the liquid crystal molecules 31 is differentiated depending upon the characteristics of the alignment layers 11 and 21. In one exemplary embodiment, the inclination direction of the liquid crystal molecules 31 may be determined by illuminating ultraviolet rays that differ in polarization direction to the alignment layers 11 and 21, or illuminating them in a slanted manner.

Depending upon the inclination direction of the liquid crystal molecules 31, a portion of the liquid crystal layer 3 formed over the pixel electrode 191 is partitioned into four regions including the left upper D1, the right upper D2, the right lower D3, and the left lower D4. The partitioned regions D1 to D4 have substantially the same size while having the horizontal and vertical center lines of the pixel electrode 191 as boundaries thereof. The inclination directions of the liquid crystal molecules placed at the regions D1 to D4 that are adjacent to each other in the horizontal and vertical directions are angled with respect to each other by about 90 degrees, but the inclination directions of the liquid crystal molecules adjacent to each other in the diagonal direction are substantially opposite to each other.

The arrows of FIG. 2 indicate the inclination directions of the liquid crystal molecules 31, which are inclined at the left upper region D1 to be in the right upper direction, at the right upper region D2 to be in the right lower direction, at the right lower region D3 to be in the left lower direction, and at the left lower region D4 to be in the left upper direction.

However, the inclination directions of the liquid crystal molecules 31 at those four regions D1 to D4 are not limited to the exemplary embodiment discussed above, and may be altered in various manners. Furthermore, the number of inclination directions of the liquid crystal molecules 31 may be more or less than four. When the inclination directions of the liquid crystal molecules are diversified, the reference viewing angle of the LCD is increased.

Meanwhile, in the present exemplary embodiment different voltages are applied to the first and second sub-pixel electrodes 191a and 191b, and based on the magnitude of the common voltage Vcom, the relative voltage of the first sub-pixel electrode 191a is generally higher than the relative voltage of the second sub-pixel electrode 191b. The inclination angle of the liquid crystal molecules is differentiated depending upon the intensity of the electric field. As the voltages of the first and second sub-pixel electrodes 191a and 191b differ from each other, the liquid crystal molecules 31 placed over the two sub-pixel electrodes 191a and 191b differ in inclination angle from each other.

Accordingly, the respective regions D1 to D4 of the liquid crystal layer 3 are divided into first sub-regions D1a, D2a, D3a, and D4a disposed over the first sub-pixel electrode 191a, and second sub-regions D1b, D2b, D3b, and D4b disposed over the second sub-pixel electrode 191b. As shown in FIG. 3, the voltage of the first sub-pixel electrode 191a is relatively high so that the liquid crystal molecules 31 of the first sub-regions D1a to D4a are inclined more than those of the second sub-regions D1b to D4b.

Consequently, the two sub-pixels PXa and PXb are differentiated in luminance from each other, and the sum of luminance thereof becomes the luminance of the pixel PX as a whole. For this reason, the voltages applied to the two sub-pixel electrodes 191a and 191b may be so established as to make the luminance of the pixel PX have the target grayscale value. That is, the voltages applied to the two sub-pixel electrodes 191a and 191b are diverged from the image signal with respect to one pixel PX.

In the meantime, when the voltages of the first and second sub-pixel electrodes 191a and 191b are appropriately controlled, the image viewed from the lateral side approximates the image viewed from the frontal side as much as possible, thereby enhancing the lateral visibility.

Another exemplary embodiment of an LCD according to the present invention will now be described in detail with reference to FIG. 4 to FIG. 7.

Figure 4:
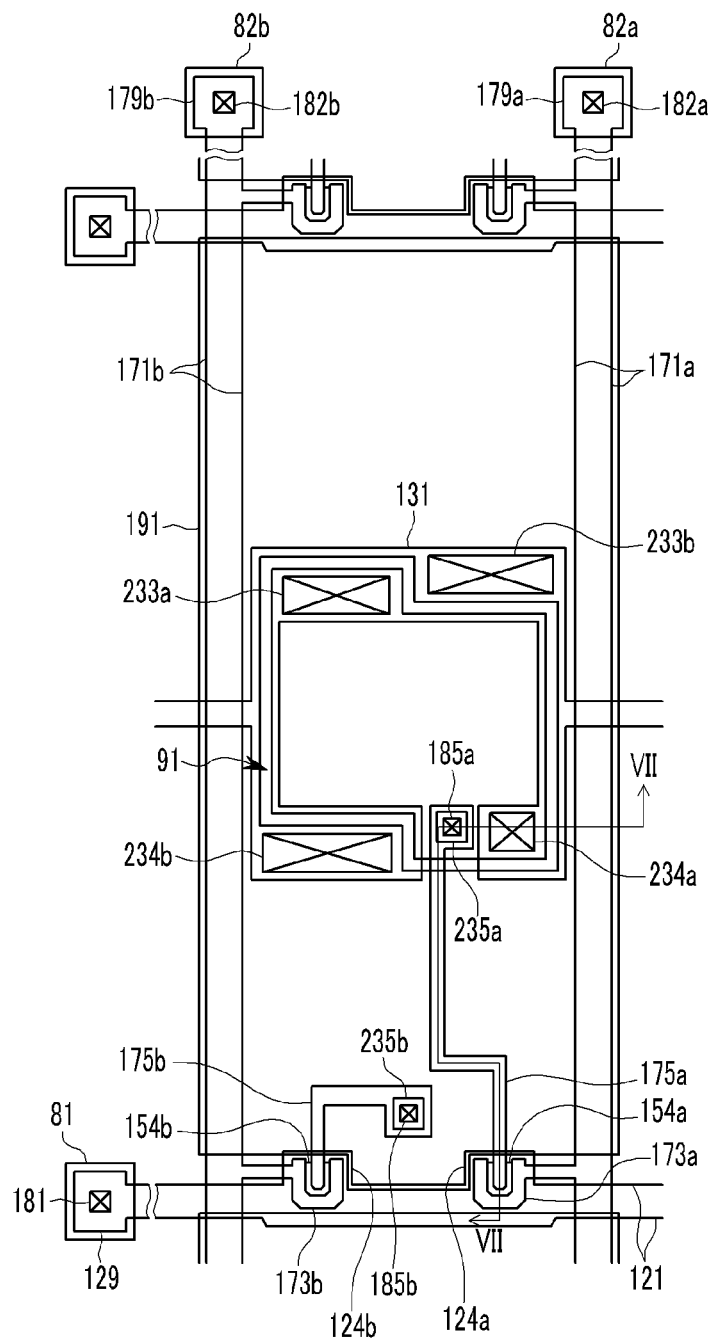
FIG. 4 is a top plan layout view of an exemplary embodiment of an LCD according to the present invention.
Figure 5:
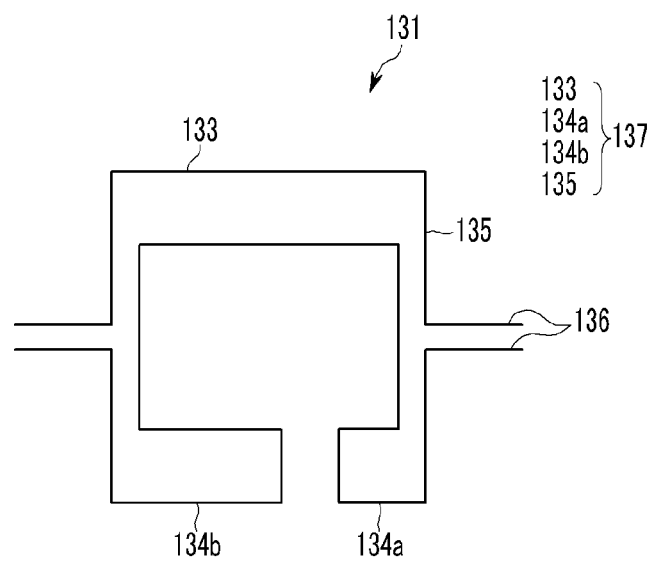
FIG. 5 is a top plan layout view of a storage electrode line of the exemplary embodiment of an LCD shown in FIG. 4.
Figure 6:
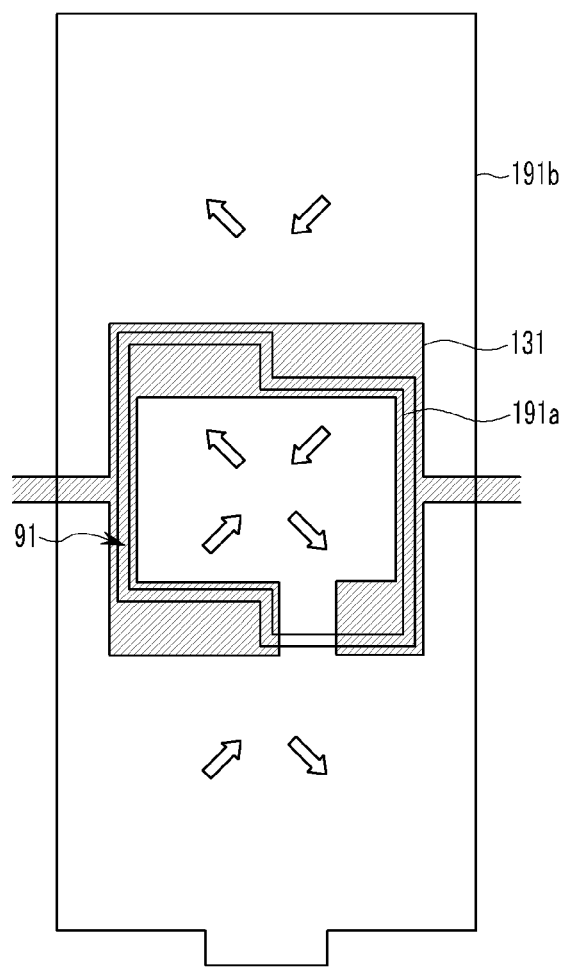
FIG. 6 is a top plan layout view of the exemplary embodiment of an LCD shown in FIG. 4 illustrating the alignment direction of the liquid crystal over a pixel electrode thereof.
Figure 7:
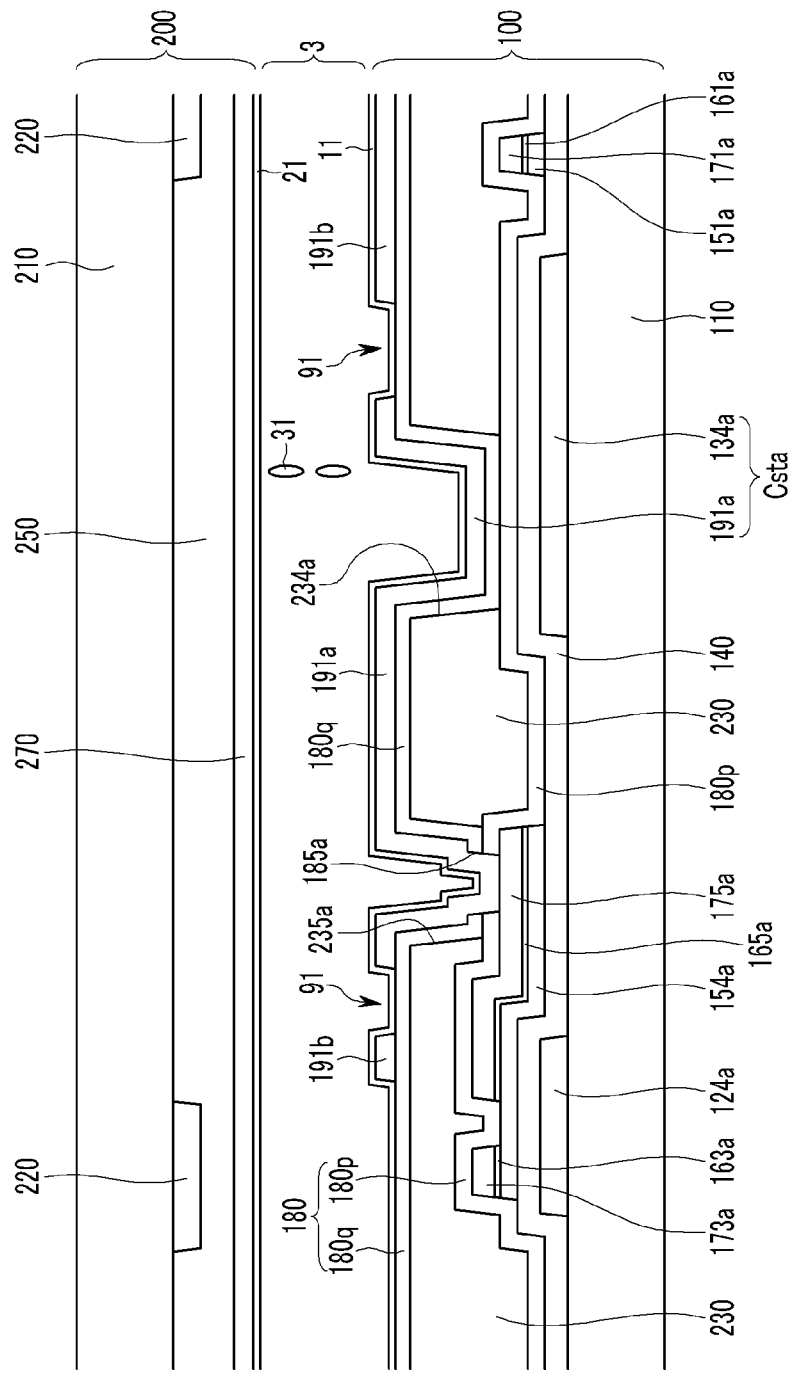
FIG. 7 is a cross-sectional view of the exemplary embodiment of an LCD shown in FIG. 4 taken along line VII-VII.

FIG. 4 is a top plan layout view of an exemplary embodiment of a LCD according to the present invention, and FIG. 5 is a top plan layout view of a storage electrode line of the exemplary embodiment of an LCD shown in FIG. 4. FIG. 6 is a top plan layout view illustrating the alignment directions of liquid crystal molecules of a pixel electrode of the exemplary embodiment of an LCD shown in FIG. 4, and FIG. 7 is a cross-sectional view of the LCD shown in FIG. 4 taken along line VII-VII.

Referring to FIG. 4 to FIG. 7, the exemplary embodiment of an LCD includes a lower display panel, also called a thin film transistor array panel 100, an upper display panel, also called a common electrode panel 200, and a liquid crystal layer 3.

The thin film transistor array panel 100 will be firstly described in detail.

Gate conductors including gate lines 121 and storage electrode lines 131 are formed on an insulation substrate 110.

The gate lines 121 proceed mainly in the horizontal direction, and each includes first and second gate electrodes 124a and 124b protruded vertically and a wide end portion 129.

The storage electrode lines 131 extend mainly in the horizontal direction, and each is interposed between the two gate lines 121.

Referring to FIG. 5, in the present exemplary embodiment, the storage electrode line 131 includes a storage electrode 137 formed in the shape of an opened quadrangular band, and connectors 136 connected thereto. The storage electrode 137 includes horizontal electrode portions 133, 134a, and 134b and vertical electrode portions 135, and the horizontal electrode portions 133, 134a, and 134b of the storage electrode 137 are larger in width than the vertical electrode portions 135 thereof. The horizontal electrode portions 133, 134a, and 134b include an upper electrode portion 133, a right lower electrode portion 134a, and a left lower electrode portion 134b. One end of the upper electrode portion 133 and one end of the right lower electrode portion 134a are connected to each other via one of the vertical electrode portions 135, and the opposite end of the upper electrode portion 133 and one end of the left lower electrode portion 134b are connected to each other via the other vertical electrode portion 135. In the present exemplary embodiment, the opposite ends of the right lower electrode 134a and the left lower electrode 134b are spaced apart from each other at a distance so as to shape an opened quadrangle. The connectors 136 are roughly connected to the centers of the vertical electrode portions 135.

A gate insulating layer 140 is formed on the gate conductors 121 and 131.

First and second semiconductor stripes 151a and 151b are formed on the gate insulating layer 140 (for convenience, reference numeral 151b is omitted in the drawing, but extends under the data line 171b, similar to the semiconductor strip 151a as discussed in detail below). The first and second semiconductor stripes 151a and 151b proceed mainly in the vertical direction, and include first and second protrusions 154a and 154b protruded toward the first and second gate electrodes 124a and 124b.

A first ohmic contact stripe 161a and a first ohmic contact island 165a are formed on the first semiconductor stripe 151a. The first ohmic contact stripe 161a has a protrusion 163a, and the protrusion 163a and the first ohmic contact island 165a face each other over the first protrusion 154a as a pair.

A second ohmic contact stripe (not shown) and a second ohmic contact island (not shown) are formed on the second semiconductor stripe 151b. The second ohmic contact stripe also has a protrusion (not shown), and the protrusion and the second ohmic contact island face each other over the second protrusion 154b as a pair.

A first data line 171a is formed on the first ohmic contact stripe 161a, and a first drain electrode 175a is formed on the first ohmic contact island 165a. A second data line 171b is formed on the second ohmic contact stripe, and a second drain electrode 175b is formed on the second ohmic contact island.

The first and second data lines 171a and 171b proceed mainly in the vertical direction, and cross the gate lines 121 and the connectors 136 of the storage electrode lines 131. The first and second data lines 171a and 171b include first and second source electrodes 173a and 173b extended toward the first and second gate electrodes 124a and 124b, and wide end portions 179a and 179b.

The first and second drain electrodes 175a and 175b each have one end placed over the first and second gate electrodes 124a and 124b while being partially surrounded by the bent portions of the first and second source electrodes 173a and 173b, and extensions extended vertically from each one end thereof, respectively.

In the present exemplary embodiment, the first ohmic contacts 161a and 165a exist only between the underlying first semiconductor 151a and the overlying first data line 171a and first drain electrode 175a so as to lower the contact resistance therebetween. The second ohmic contact exists only between the underlying second semiconductor 151b and the overlying second data line 171b and second drain electrode 175b so as to lower the contact resistance therebetween. The first semiconductor stripe 151a has substantially the same planar shape as the first data line 171a, the first drain electrode 175a, and the first ohmic contacts 161a and 165a. The second semiconductor stripe 151b has substantially the same planar shape as the second data line 171b, the second drain electrode 175b, and the second ohmic contact. However, the semiconductors 151a and 151b have exposed portions not covered by the data lines 171a and 171b and the drain electrodes 175a and 175b, including exposed portions thereof between the source electrodes 173a and 173b and the drain electrode 175a and 175b.

A passivation layer 180 is formed on the first and second data lines 171a and 171b, the first and second drain electrodes 175a and 175b, and the exposed portions of the semiconductors 151a and 154b. The passivation layer 180 includes lower and upper layers 180p and 180q, which in the present exemplary embodiment may include an inorganic insulating material, exemplary embodiments of which include silicon nitride, silicon oxide and other materials having similar characteristics. Exemplary embodiments include configurations wherein at least one of the lower and upper layers 180p and 180q may be omitted.

The passivation layer 180 has contact holes 182a and 182b exposing the end portions 179a and 179b of the data lines 171a and 171b, and contact holes 185a and 185b exposing the wide end portions of the drain electrodes 175a and 175b. The passivation layer 180 and the gate insulating layer 140 have a plurality of contact holes 181 exposing the end portions 129 of the gate lines 121 in common.

In the present exemplary embodiment, a color filter 230 is formed between the lower and the upper layers 180p and 180q.

The color filter 230 has through holes 235a and 235b corresponding to the contact holes 185a and 185b of the passivation layer 180, and in the present exemplary embodiment the through holes 235a and 235b are larger in size than the contact holes 185a and 185b of the passivation layer 180. The color filter 230 further has a plurality of openings 233a, 233b, 234a, and 234b over the storage electrodes 137. The openings 233a and 233b of the color filter 230 are formed over the upper electrode portion 133, and the openings 234a and 234b of the color filter 230 are formed over the right lower electrode 134a and the left lower electrode 134b, respectively.

Pixel electrodes 191 and a plurality of contact assistants 81, 82a, and 82b are formed on the upper layer 180q of the passivation layer 180.

As shown in FIG. 4, the pixel electrode 191 according to the present exemplary embodiment has substantially the same shape as that shown in FIG. 2. That is, the pixel electrode 191 includes first and second sub-pixel electrodes 191a and 191b spaced apart from each other with a gap 91 disposed therebetween.

The gap 91 between the first and second sub-pixel electrodes 191a and 191b overlaps the storage electrode 137. The storage electrode 137 prevents the leakage of light between the first and second sub-pixel electrodes 191a and 191b, and simultaneously prevents an unwanted texture that may be generated due to the photo-alignment. The texture induced by the photo-alignment is generated around the gap 91 in the orientation direction of the liquid crystal molecules.

In one exemplary embodiment, as shown in FIG. 6, the texture generation may occur at the left upper and right lower portions of the first sub-pixel electrode 191a, and the right upper and left lower portions of the second sub-pixel electrode 191b. Accordingly, when the left half of the first sub-pixel electrode 191a is oriented upward and the right half thereof is oriented downward, the texture-generating regions of the first sub-pixel electrode 191a linearly coincide with those of the second sub-pixel electrode 191b. Therefore, the texture-generating regions can be effectively covered only with a simple and small storage electrode 137.

The pixel electrode 191 is also overlapped with the storage electrode 137 so as to form a storage capacitor. That is, the first sub-pixel electrode 191a is overlapped with the upper electrode portion 133 and the right lower electrode portion 134a so as to form a storage capacitor Csta, and the second sub-pixel electrode 191b is overlapped with the upper electrode portion 133 and the left lower electrode 134a so as to form a storage capacitor Cstb. As the pixel electrode 191 and the storage electrode 137 are overlapped with each other with only the passivation layer 180 disposed therebetween in the openings 233a and 234a of the color filter 230, the capacitance of the storage capacitor is increased.

The first and second gate electrodes 124a and 124b, the first and second protrusions 154a and 154b of the first and second semiconductor stripes 151a and 151b, the first and second source electrodes 173a and 173b and the first and second drain electrodes 175a and 175b form first and second TFTs Qa and Qb, and the first and second drain electrodes 175a and 175b are connected to the first and second sub-pixel electrodes 191a and 191b through the contact holes 185a and 185b.

The contact assistants 81, 82a, and 82b are connected to the end portion 129 of the gate line 121 and the end portions 179a and 179b of the data lines 171a and 179b through the contact holes 181, 182a, and 182b, respectively. The contact assistants 81, 82a, and 82b serve to assist the adhesion of the end portion 129 of the gate line 121 and the end portions 179a and 179b of the data lines 171a and 171b to an external device such as a driver IC, and protect them. Alternative exemplary embodiments include configurations wherein the contact assistants 81, 82a and 82b may be omitted. In one such alternative exemplary embodiment, the gate lines 121, data lines 171 and storage electrode lines 131 may be connected directly to external driving sources.

The common electrode panel 200 will now be described in detail.

A plurality of light blocking members 220 are formed on an insulation substrate 210, and a planarization layer 250 is formed on the light blocking members 220. A common electrode 270 is formed on the planarization layer 250.

Alignment layers 11 and 21 are formed on the surfaces of the TFT array panel 100 and the common electrode panel 200 facing each other, respectively. Detailed description of the alignment layers 11 and 21 will now be given.

The exemplary embodiments of the alignment layers 11 and 21 according to the present invention will now be described in detail with reference to FIG. 7 to FIG. 9.

Figure 8A:
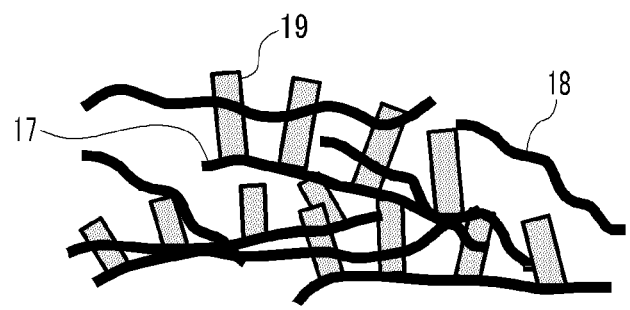
FIGS. 8A and 8B are conceptual cross-sectional views of an exemplary embodiment of an alignment layer according to the present invention in different stages of formation.
Figure 8B:
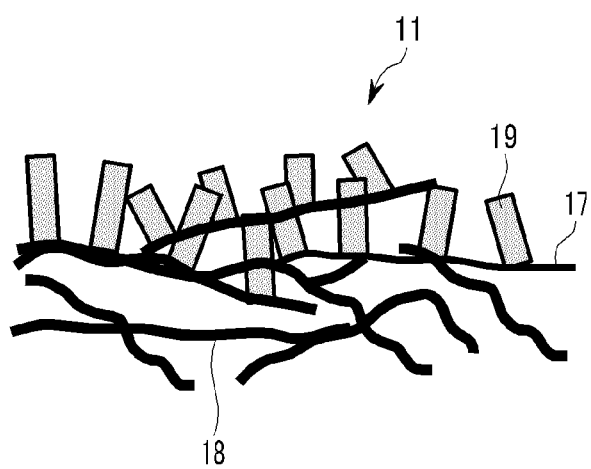
Figure 9:
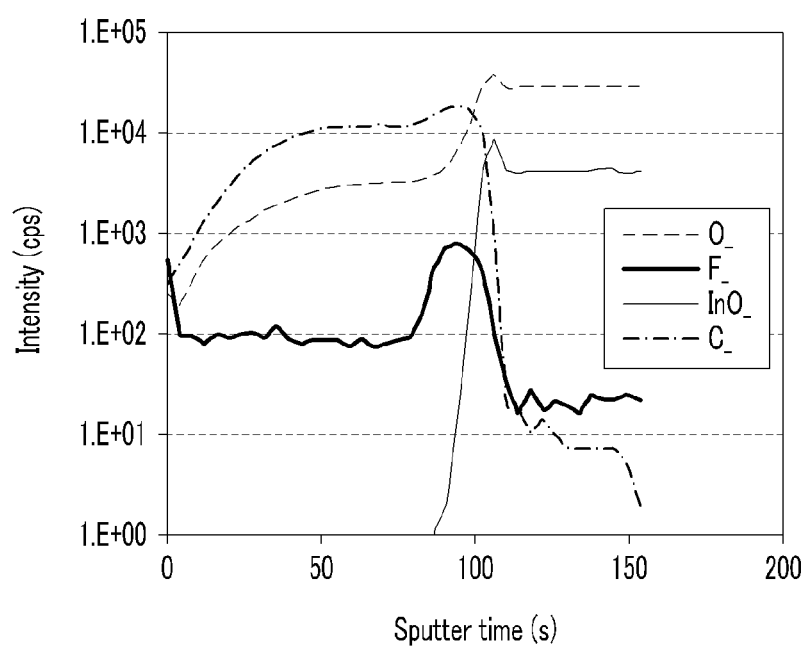
FIG. 9 is a graph illustrating the results of analyzing an exemplary embodiment of an alignment layer according to the present invention by using a time of flight secondary ion mass spectrometry ("TOF-SIMS") technique.

FIGS. 8A and 8B are conceptual cross-sectional views of an exemplary embodiment of an alignment layer according to the present invention in different stages of formation, and FIG. 9 is a graph illustrating results of analyzing an exemplary embodiment of an alignment layer according to the present invention by using a technique of time of flight secondary ion mass spectrometry ("TOF-SIMS").

In the present exemplary embodiment, the alignment layers 11 and 21 comprise a mixture of a vertical photo-alignment material 17 containing a vertical functional group 19 in the side chain thereof, and a major alignment material 18 generally used in the vertical alignment ("VA") mode or the twisted nematic mode. As shown in the transition from FIG. 8A to FIG. 8B, the vertical photo-alignment material 17 and the major alignment material 18 are put in a micro-phase separation ("MPS") state. The MPS state of the alignment layers 11 and 21 is a structure generated when a mixture of the vertical photo-alignment material 17 and the major alignment material 18 is applied onto the pixel and the common electrodes 191 and 270, and hardened.

Although not shown in FIGS. 8A and 8B, in one exemplary embodiment, ultraviolet rays are illuminated onto the alignment layers 11 and 21 with the MPS structure, and as a result, alignment layers 11 and 21 are formed by way of the reaction of a photo-reactive group. Few side products due to the illumination of ultraviolet rays are made in the alignment layers 11 and 21, and afterimages of the LCD are reduced, thereby improving display quality.

Furthermore, as the alignment layers 11 and 21 are formed only by way of the illumination of ultraviolet rays without performing a rubbing process in a separate manner, the production cost is reduced and the production speed is increased. The vertical photo-alignment material 17 is mainly formed on the surface side closer to the liquid crystal layer 3, and the major alignment material 18 is mainly formed closer to the substrates 110 and 210. Accordingly, toward the surface of the alignment layers 11 and 21, e.g., closer to the liquid crystal layer 3, the molar concentration ratio of the vertical photo-alignment material 17 to the major alignment material 18 increases.

The vertical functional group contained in the vertical photo-alignment material 17 may exist from the surface of the alignment layer to a depth of the alignment layer corresponding to about 20% of the entire thickness thereof, and in such an exemplary embodiment, the MPS structure may be formed more clearly.

In the present exemplary embodiment, the vertical photo-alignment material 17 is a polymer material with a weight average molecular weight of about 1000 to about 1,000,000, and is a compound having a main chain bonded with at least one side chain. The side chain may include at least one of a flexible functional group, a thermoplastic functional group, a photo-reactive group, a vertical functional group, and various other materials having similar characteristics. The main chain may include at least one compound selected from polyimide, polyamic acid, polyamide, polyamicimide, polyester, polyethylene, polyurethane, polystyrene, and other materials having similar characteristics. Exemplary embodiments of the main chain may increasingly contain a cyclic structure such as an imide group, in order to further reinforce the rigidity of the main chain.

Accordingly, spots generated when the LCD is operated for a long period of time are reduced, and the stability with respect to the pre-tilt of the alignment layer is reinforced. Furthermore, in the exemplary embodiment wherein the main chain contains an imide group at a concentration of about 75 mol % or more, the spots are further reduced, and the stability with respect to the pre-tilt of the alignment layer is further reinforced. In the present exemplary embodiment, the pre-tilt angle is about 80 degrees to about 90 degrees.

The flexible functional group or the thermoplastic functional group is a functional group serving to make the side chain bonded to the main chain be easily aligned, and in an exemplary embodiment may contain a substituted or non-substituted alkyl or alkoxy group with a carbon number of about 3 to 20.

The photo-reactive group is a functional group that directly causes a photo-dimerization reaction or a photo-isomerization reaction by way of the illumination of ultraviolet rays. In one exemplary embodiment, the photo-reactive group may contain at least one compound selected from an azo-based compound, a cinnamate-based compound, a chalcone-based compound, a coumarin-based compound, a maleimide-based compound, and other compounds having similar characteristics.

In one exemplary embodiment, the vertical functional group is a functional group that moves the whole side chain in the direction vertical to the main chain standing parallel to the substrates 110 and 220, and may contain at least one compound selected from the group consisting of an aryl group substituted with at least one of a $C_3$-$C_{10}$ alkyl group and a $C_3$-$C_{10}$ alkoxy group, and a cyclohexyl group substituted with at least one of a $C_3$-$C_{10}$ alkyl group and a $C_3$-$C_{10}$ alkoxy group.

In one exemplary embodiment, the vertical photo-alignment material 17 may be prepared by polymerizing a monomer such as diamine with acid anhydride. Diamine may be bonded with at least one of the side chains such as a flexible functional group, a photo-reactive group, and a vertical functional group. Furthermore, the vertical photo-alignment material 17 may be prepared by adding a compound bonded with a thermoplastic functional group, a photo-reactive group, or a vertical functional group to polyimide or polyamic acid. In such an exemplary embodiment, as the thermoplastic functional group is directly bonded to the polymer main chain, the side chain contains the thermoplastic functional group, photo-reactive group, vertical functional group, and other materials having similar characteristics.

The major alignment material 18 may contain the above-identified polymer main chain, and the weight average molecular weight thereof may be from about 10,000 to about 1,000,000. When the major alignment material 18 contains the imide group at a concentration of about 50 mol % to about 80 mol %, the spots and afterimages of the LCD are further reduced. The major alignment material 18 may contain a vertical functional group as a side chain bonded to the polymer main chain at a concentration of about 5 mol %.

Figure 12:
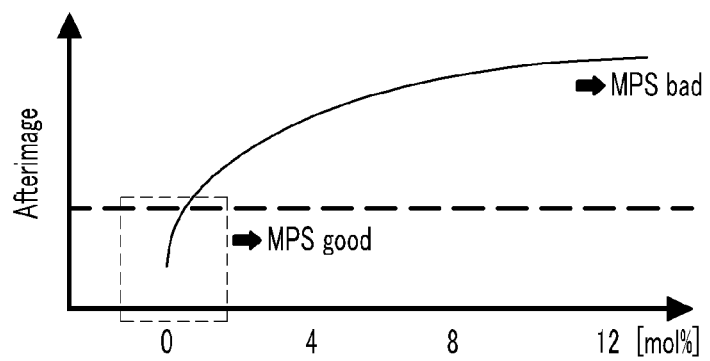
FIG. 12 is a graph illustrating the afterimage degree of an exemplary embodiment of an LCD with an exemplary embodiment of an alignment layer according to the present invention.

FIG. 12 is a graph illustrating the degree of afterimages in an exemplary embodiment of an LCD as a function of the mol % of the vertical functional group contained in the major alignment material 18. As shown in FIG. 12, when the major alignment material 18 contains the vertical functional group at a concentration of about 5 mol % or less, the afterimages of the LCD are drastically, or exponentially, reduced. Furthermore, when the major alignment material 18 contains the vertical functional group at a concentration of about 2 mol % or less, the afterimages of the LCD are even further reduced.

In one exemplary embodiment, the weight ratio of the vertical photo-alignment material 17 to the major alignment material 18 in the mixture may be about 5:95 to 50:50. If the content of the vertical photo-alignment material 17 in the mixture is about 50 wt % or less, the voltage holding rate ("VHR") increases so that the afterimages of the LCD can be reduced. If the content of the vertical photo-alignment material 17 in the mixture is about 5 wt % or more, the pre-tilt uniformity is maintained so that the spots of the LCD are reduced. In one exemplary embodiment, in case that the weight ratio of the vertical photo-alignment material 17 to the major alignment material 18 in the mixture may be about 10:90 to 40:60, afterimages and spots of the LCD may further be reduced.

Figure 11:
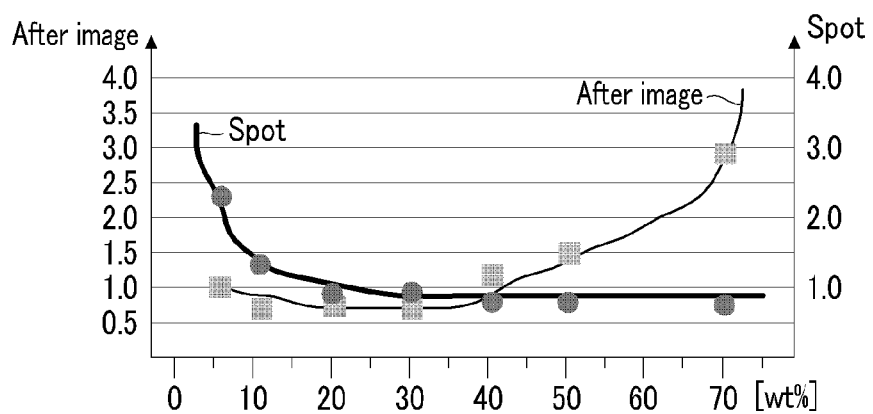
FIG. 11 is a graph illustrating spot and afterimage degrees of an exemplary embodiment of an LCD with an exemplary embodiment of an alignment layer according to the present invention.

FIG. 11 is a graph illustrating the degree of afterimage and spots as a function of the weight percent (wt %) of the vertical photo-alignment material 17, and it may be shown from the graph that when the content of the vertical photo-alignment material 17 in the mixture is about 10 wt % to 40 wt %, the afterimage and spots of the LCD are further reduced. Furthermore, as the content of the vertical photo-alignment material 17 in the mixture becomes smaller, the photo-reactive group is reduced and few unnecessary byproducts are generated. Consequently, the afterimages of the LCD are reduced and the reaction efficiency increases. As the content of the vertical photo-alignment material 17 in the mixture decreases, the production cost is also reduced.

In the present exemplary embodiment, the vertical photo-alignment material 17 and the major alignment material 18 each have surface tension of about 25-65 dyne/cm, respectively. Because the surface tension of the vertical photo-alignment material 17 in the present exemplary embodiment is equal to or less than that of the major alignment material 18, and thus, the MPS structure becomes clearer.

The graph shown in FIG. 9 is produced based on the technique of TOF-SIMS, and the material composition of the target alignment layer is shown as discussed below.

In the present exemplary embodiment, the vertical photo-alignment material 17 was formed by polymerizing diamine with acid dianhydride. The diamine contains two side chains, each side chain including fluorine (F), an aryl group, and cinnamate. At this time, the content of the vertical photo-alignment material 17 was 20 wt %. In the present exemplary embodiment, the fluorine (F) content has a role as an indicator for detecting the vertical photo-alignment material 17. Polyimide with no content of vertical functional group was used as the major alignment material 18 at an amount of 80 wt %. An indium tin oxide ("ITO") thin film was formed on a substrate, and a mixture of the vertical photo-alignment material 17 and the major alignment material 18 was printed on the ITO thin film. After the printed mixture was hardened, linearly polarized ultraviolet rays were illuminated thereto to thereby form an alignment layer with a thickness of about 1000 Å.

As illustrated in FIG. 9, the intensity of the fluorine (F) content in the vertical functional group was radically reduced in a very short period of time, and it turned out from the measurement that the fluorine (F) content was no longer found above about 91 Å of a depth of the alignment layer from the surface thereof. Accordingly, as the vertical photo-alignment material 17 was formed up to about 9% from the surface and the major alignment material 18 was formed under the vertical photo-alignment material 17, the MPS structure was clearly formed. Furthermore, an LCD with the alignment layers was driven, and it was shown that few linear afterimages and surface afterimages existed.

Figure 10:
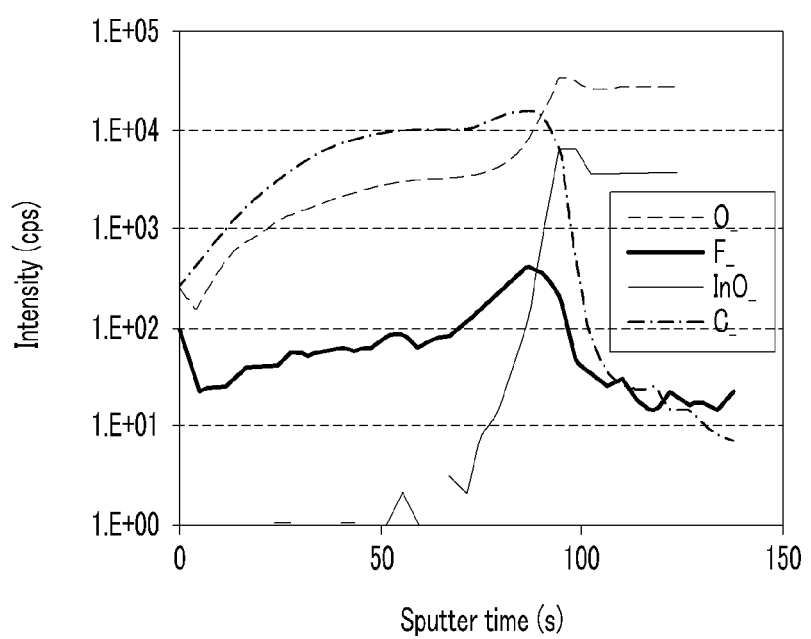
FIG. 10 is a graph illustrating the results of analyzing an exemplary embodiment of an alignment layer according to present invention by using a TOF-SIMS technique.

FIG. 10 is a graph illustrating the results of analyzing an exemplary embodiment of an alignment layer according to the present invention by way of the technique of TOF-SIMS. The material composition of the target alignment layer was the same as that related to FIG. 7 except that the content of the vertical photo-alignment material 17 was about 10 wt % and the content of the major alignment material 18 was about 90 wt %. In such an exemplary embodiment, the fluorine content no longer existed above about 42 Å of a depth of the alignment layer from the surface thereof, and very few linear afterimages and surface afterimages existed.

An exemplary embodiment of a method of manufacturing an exemplary embodiment of an LCD according to the present invention will now be described in detail. However, overlapping descriptions will be omitted.

TFTs including gate electrodes 124a and 124b, source electrodes 173a and 173b, drain electrodes 175a and 175b and semiconductors 154a and 154b are formed on a substrate 110. Lower and upper layers 180p and 180q are formed on the thin film transistors. A color filter 230 is formed between the lower and the upper layers 180p and 180q. Pixel electrodes 191a and 191b and contact assistants 81 and 82 are formed on the upper layer 180q.

A mixture of a vertical photo-alignment material 17 and a major alignment material 18 is printed onto the pixel electrodes 191a and 191b and the contact assistants 81 and 82. In one exemplary embodiment, the photo-alignment material 17 and major alignment material 18 may be printed via inkjet printing, and subsequently hardened. In one exemplary embodiment, the hardening may be performed in two steps. According to one exemplary embodiment, the mixture is pre-baked at about 70-80° C. for about 2 to about 3 minutes to thereby remove a solvent therefrom, and is hardened at about 210° C. or more for about 10 to about 20 minutes to thereby form a MPS structure. At this time, the vertical photo-alignment material 17 is formed at the upper side area, and the major alignment material 18 is formed at the lower side area.

Thereafter, ultraviolet rays are illuminated onto the substrate 110. Exemplary embodiments include configurations wherein the ultraviolet rays are oriented in a vertical or inclined direction with respect to the substrate 110. According to the present exemplary embodiment, as it is not needed to conduct a rubbing process in a separate manner to form the alignment layer 11, the production speed is increased and the production cost is reduced. Furthermore, the direction of illuminating ultraviolet rays may be altered using a mask so that multi-domains that are differentiated in pre-tilt direction may be formed. In one exemplary embodiment, the ultraviolet rays may be partially polarized ultraviolet rays or linearly polarized ultraviolet rays. In one exemplary embodiment, the wavelength of the ultraviolet rays may be about 270 nm to about 360 nm, and the energy thereof may be about 10 mJ to about 5,000 mJ.

Subsequently, a liquid crystal layer 3 is formed on the alignment layer 11 or the alignment layer 21.

Meanwhile, a light blocking member 220, an overcoat 250, and a common electrode 270 are sequentially formed on a substrate 210. An alignment layer 21 is formed on the common electrode 270 in substantially the same way as that of the formation of the alignment layer 11.

The substrate 210 is disposed such that the alignment layer 21 formed on the substrate 210 contacts the liquid crystal layer 3, and the two substrates 110 and 210 are combined with each other.

However, in the alternative exemplary embodiment wherein the liquid crystal layer 3 is formed on the alignment layer 21 of the substrate 210, the substrate 210 is disposed such that the alignment layer 11 formed on the substrate 110 contacts the liquid crystal layer 3, and the two substrates 110 and 210 are combined with each other.

A common thin film deposition or photolithography-based patterning method may be used in order to form TFTs and electrodes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a second substrate disposed facing the first substrate;
an alignment layer disposed on at least one of the first substrate and the second substrate, wherein the alignment layer comprises a major alignment material, and a vertical photo-alignment material, and wherein the vertical photo-alignment material is a polymer that comprises a first vertical functional group and a photo-reactive group; and
a liquid crystal layer interposed between the first substrate and the second substrate,
wherein the major alignment material and the vertical photo-alignment material are in a micro-phase separation state from each other in a direction substantially vertically with respect to the first substrate,
wherein a molar concentration ratio of the vertical photo-alignment material to the major alignment material increases toward a surface of the alignment layer closer to the liquid crystal layer; wherein liquid crystal molecules of the liquid crystal layer are inclined by the alignment layer.

2. The liquid crystal display of claim 1, wherein the vertical photo-alignment material is mainly disposed toward a surface of the alignment layers closer to the liquid crystal layer, and the major alignment material is mainly disposed toward the surface of the alignment layers farther to the liquid crystal layer.

3. The liquid crystal display of claim 1, wherein a weight ratio of the vertical photo-alignment material to the major alignment material is from about 5:95 to about 50:50.

4. The liquid crystal display of claim 3, wherein a weight ratio of the vertical photo-alignment material to the major alignment material is about 20:80.

5. The liquid crystal display of claim 4, wherein the first vertical functional group is disposed within the alignment layer from the surface of the alignment layer to a depth of the alignment layer corresponding to about 20% of a thickness thereof.

6. The liquid crystal display of claim 1, wherein the major alignment material comprises a second vertical functional group.

7. The liquid crystal display of claim 1, wherein the photo-reactive group includes a cinamate-based compound.

8. The liquid crystal display of claim 1, wherein the vertical photo-alignment material includes a main chain connected with at least one side chain, and wherein the main chain includes at least one of polyimide and polyamic acid, and the side chain includes at least one of the first vertical functional group and the photo-reactive group.

9. The liquid crystal display of claim 1, wherein the major alignment material includes a material used in a vertical alignment mode or in a twisted nematic mode.

10. The liquid crystal display of claim 1, wherein the vertical photo-alignment material comprises a diamine-based compound having a first side chain and a second side chain.

11. The liquid crystal display of claim 1, further comprising:
a pixel electrode disposed on the first substrate or the second substrate, wherein the pixel electrode comprises a first sub-pixel electrode and a second sub-pixel electrode, and the first sub-pixel electrode and the second sub-pixel electrode are separated from each other.

12. The liquid crystal display of claim 11, wherein the first sub-pixel electrode and the second sub-pixel electrode include a plurality of domains, respectively.

13. The liquid crystal display of claim 11, wherein voltages applied to the first sub-pixel electrode and the second sub-pixel electrode are different from each other.

14. The liquid crystal display of claim 11, further comprising a light blocking member overlapping the first sub-pixel electrode and the second sub-pixel electrode.

15. The liquid crystal display of claim 1, wherein the liquid crystal has negative dielectric anisotropy, and is aligned substantially vertically with respect to the first substrate and second substrate.

16. The liquid crystal display of claim 1, wherein a pre-tilt angle of the liquid crystal is about 80 degrees to about 90 degrees.

17. The liquid crystal display of claim 1, wherein the liquid crystal layer has multiple domains that are differentiated in pre-tilt direction according to a direction in which the light is illuminated onto the alignment layer in the micro-phase separation state.

* * * * *